Dec. 2, 1930.   J. CANNY ET AL   1,783,639
TUBE FLANGING WRENCH
Filed July 1, 1929   3 Sheets-Sheet 1
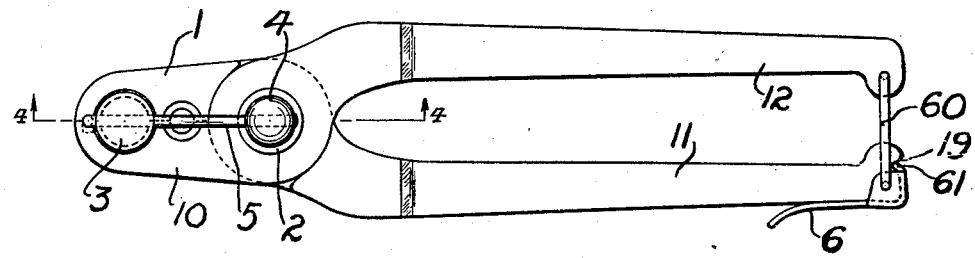
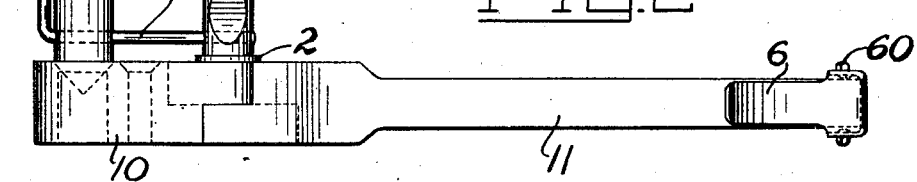
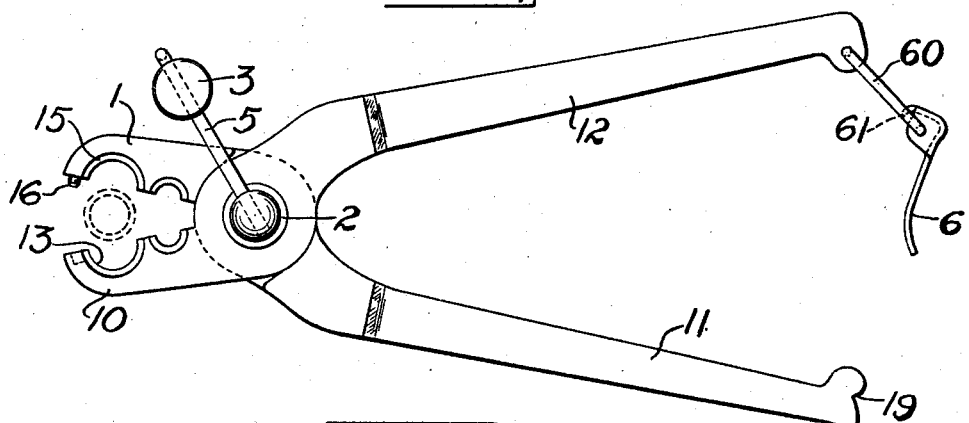
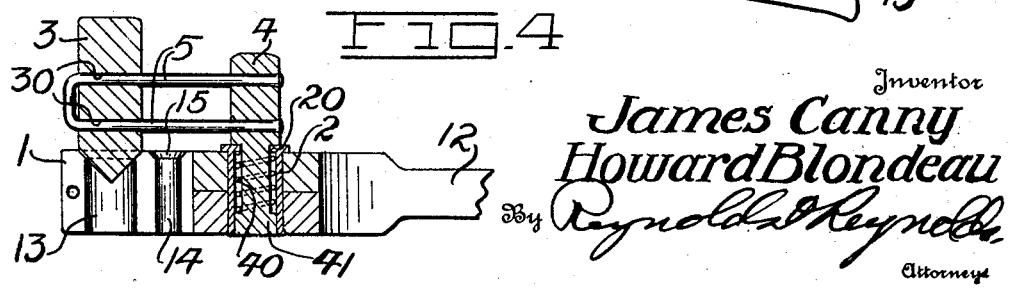
Inventor
*James Canny*
*Howard Blondeau*

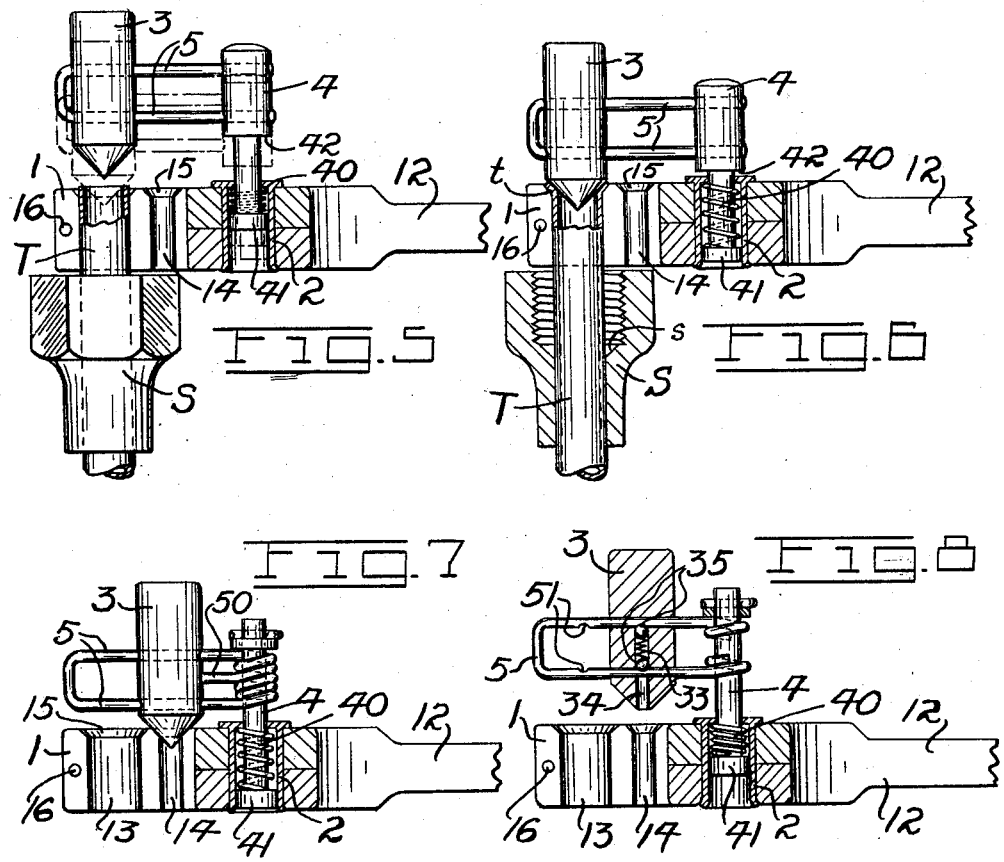

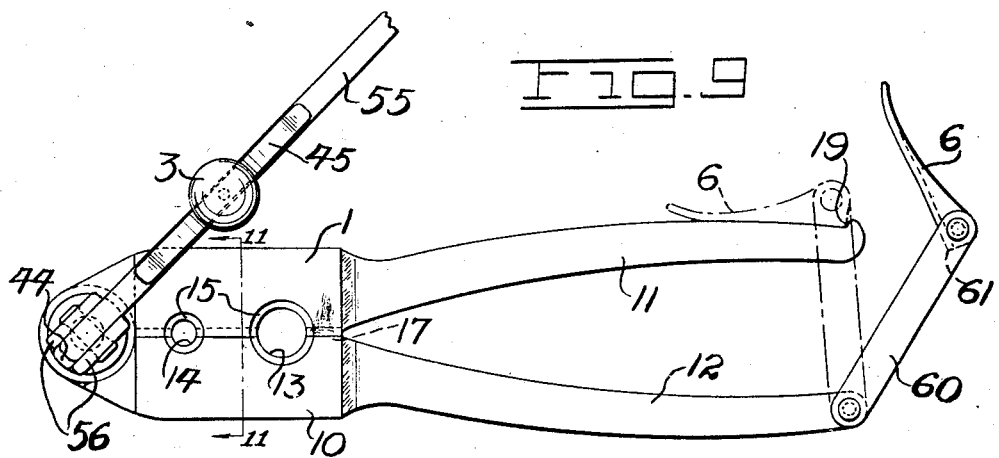
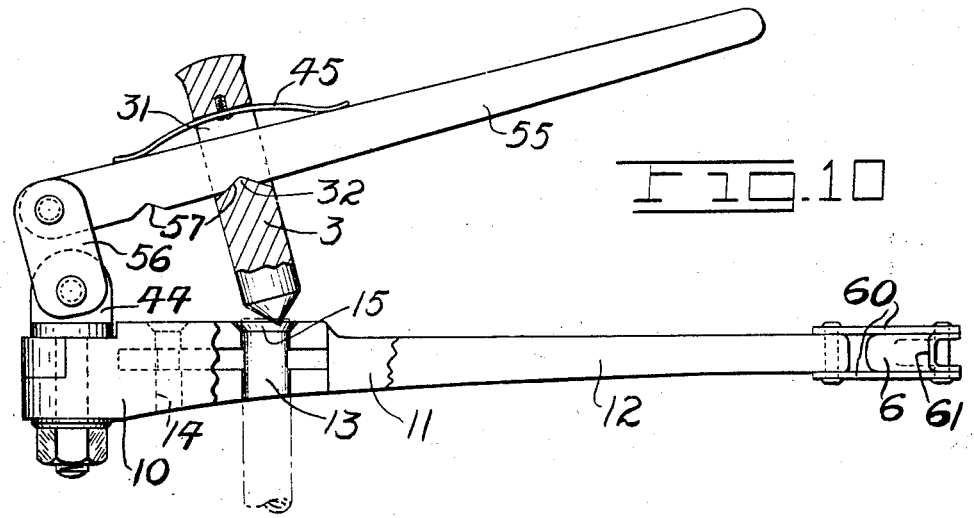
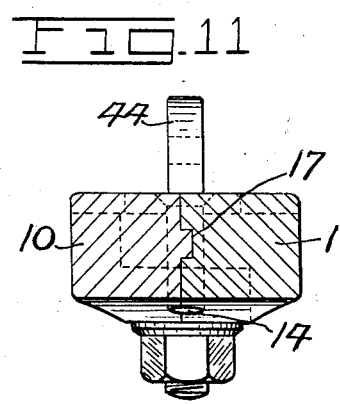

Patented Dec. 2, 1930

1,783,639

UNITED STATES PATENT OFFICE

JAMES CANNY AND HOWARD BLONDEAU, OF SEATTLE, WASHINGTON

TUBE-FLANGING WRENCH

Application filed July 1, 1929. Serial No. 375,047.

Our invention relates to improvements in devices for upsetting or expanding the ends of tubing, as copper tubing, for example, preliminary to joining the end of the tube to some other fitting or member, as for example, to join two ends by a union, or to join an end of a copper tube to a tank header or the like.

The use of copper tubing has increased to a considerable degree of late, it being used for refrigeration plants, for plumbing instead of pipe, and for many and varied uses. It is necessary each time an end of the tube is to be secured to upset its end, and it is our main object, therefore, to provide a tool which can be taken out by the workman, by means of which copper tubing of any selected size or of various sizes can be easily and rapidly upset or expanded to fit the union or other connection, by means of which it is secured.

Such a tool necessarily involves something in the nature of an expander which enters the end of the tube and expands the same, and generally something in the nature of gripping or holding members, as jaws, by means of which the tube end is held during the expanding operation. One object of our invention is to provide a tool by means of which the gripping and holding, and the expanding as well, can be accomplished by one tool, not involving parts which are separable, and thus preventing loss of essential parts, and loss of time in finding them.

It is a further object to provide a tool of the general character indicated, wherein the expanding element, a drift pin for example, will naturally aline itself properly with the tube and the means for holding the same to insure a more perfect and uniform expansion of the tube end.

A further object is the provision of a tool of this character which can be employed in cramped spaces.

A further object is to provide a tool wherein the idea of combining all parts in one, so that there are no separable parts, can be employed in association with the thought of making one tool fit several sizes of tubing, thus providing means for adjustment of the expanding member or drift pin.

Other objects, and especially those which pertain more particularly to structural details, will be ascertained best from a study of the drawings forming part of this specification, of the specification itself, and the claims which terminate the same.

In the accompanying drawings we have shown our invention in forms which are now preferred by us.

Figure 1 is a plan view and Fig. 2 a side elevation of the tool shown in gripping or clamping position;

Fig. 3 is a plan view of the tool shown open, ready to receive a piece of tubing;

Fig. 4 is a detail section on the line 4—4 of Fig. 1;

Fig. 5 is a view similar to Fig. 4, showing the tool ready to take position to expand the end of a piece of tubing, and Fig. 6 is a similar view, showing the tubing expanded and ready to be removed from the tool;

Fig. 7 is a view similar to Figs. 4, 5, and 6, showing the tool adjusted for a smaller size of tubing;

Fig. 8 is a view similar to Figs. 4, 5, 6, and 7, but showing a slight modification;

Fig. 9 is a plan view, and Fig. 10 a side elevation, with parts broken away, of a further modified form of the tool; and Fig. 11 is a section on the line 11—11 of Fig. 9.

Essentially, our device comprises a means for gripping or clamping the end of a piece of tubing, which may take the form of two gripping members or jaws 1 and 10, formed as parts of pivotally connected handle members 11 and 12, respectively. In the preferred form, shown in Figures 1 to 8 inclusive, the pivot is between the ends of these handles or levers, and while any suitable form of pivot may be employed, we have shown the pivot sleeve 2 (see Fig. 4) passing through registering holes in these levers and pivotally joining them, after the fashion of a pair of pliers. The gripping members or jaws 1 and 10 are provided with die halves 13 and 14, which, when the jaw members are closed, as seen in Fig. 1, form a complete cylindrical die which grips the end of a piece of tubing T inserted between the complemental die halves. The upper ends of these die halves are beveled or countersunk as indicated at 15, and when such a member as the pointed drift pin 3, held in axial alinement with any one of the dies, is driven into the die the end of the tubing T is upset, as may be seen in Fig. 6, and this upset flange t forms a means of holding the tubing and drawing it up against a support. Thus, for instance, the sleeve S is provided with threads to join it to another fitting, and is provided with a beveled surface s which will engage the flange t. To maintain the two halves of the die in proper registry a dowel pin 16 or like member may be employed in the one jaw, fitting into a corresponding recess in the opposite jaw (see Fig. 3).

The drift pin 3 is provided with a support from the main tool itself, and this may take various forms, as may be seen from the several types illustrated in the drawings. In the preferred form a post 4 is received in the sleeve 2 so as to be coaxial therewith, and is held within the sleeve by suitable means, such as the spring 40 interposed between a head 41 of the post 4, and an inturned flange 20 of the sleeve 2. Supported upon the post 4 is an arm 5 which in the preferred form may consist of a wire bent in U-shape. The drift pin 3 is provided with through bores 30 which receive the wires of the arm 5, so that the drift pin 3 may slide lengthwise of the arm. The reason for this is to permit the drift pin to be brought into registry and axial alinement with each of the several dies, of which two are shown, namely, 13 and 14. Preferably, the beveled point of the drift pin will center the pin accurately with respect to these dies and the tube held therein. The spring 40 permits yielding axial movement of the post 4 and drift pin 3, so that the drift pin may be raised, as may be seen in Fig. 5, to permit it to be swung into position in alignment with one of the dies, or to be withdrawn therefrom and swung aside. When it is ready, in the position shown in dot-and-dash lines in Fig. 5, the spring 40 is somewhat compressed, but the shoulder 42 of the post 4 is spaced from the end of the sleeve 2. Now, if the drift pin 3 be struck a blow with a hammer or mallet, it will enter farther into the end of the tube T and expand the same, as may be seen in Fig. 6.

If it is desired to employ the tool on a different size of tube, it is only necessary to grasp the drift pin 3 and slide it, after it has been moved axially out of the die with which it was engaged, into position to register with the selected die, and it has been shown so shifted in Figs. 7 and 8.

Fig. 7 shows a stop 50 engaging the side of the drift pin to fix it in position to register with the innermost die 14. The bottom of the U arm 5 may form a natural stop for the drift pin in its outermost position. However, should it be desired to more accurately position the drift pin, this may be done by providing notches 51 in the arm 5, and by positioning spring-held balls 35 within a bore 34 of the drift pin, these balls being pressed outward by a spring 33 into engagement with the notches 51, and when so engaged to position the drift pin 3 accurately with respect to any selected die.

As is indicated in Figs. 7 and 8, the ends of the arm 5, instead of passing into the post 4, may be wrapped about the upper end of this post, or they may be connected with the post in any suitable manner. As a matter of fact, a connection and support of quite different character is illustrated in Figs. 9, 10, and 11, yet the tool is the same in principle. In these latter figures the arm 55 is pivotally supported through a link 56 with the upper end of a post 44, this post forming itself the pivot for the jaw members 1 and 10. In this form the pivot is at the extreme ends of the two jaw members, rather than between their ends. Also, the drift pin 3 is slidable along the arm 55, and the necessity for yielding is accommodated by some such means as the flat leaf-spring 45, which is secured within a slot 31 of the drift pin. The drift pin in this instance is shown as provided with a wedge or finger 32 which engages within notches 57 in the under side of the arm 55 to more exactly position the drift pin relative to the dies 13 and 14, should this be deemed desirable. Instead of the dowel pin 16 the jaw members are shown as provided with complemental tongue and groove members 17.

In all forms it will generally be found desirable to provide some means for securing the jaws in clamped position while the workman is engaged in driving home the drift pin, and for this purpose we may employ any means found suitable, such as the locking lever illustrated, and consisting of the link 60 pivotally mounted at the end of one of the handle members, as 12, and having pivoted thereon a lever 6 having a toe 61 engageable in a notch 19 on the opposite handle member, as 11. Figs. 1 and 2 show this locking device in the locked position, and Fig. 3 shows the same released.

It is believed that the mode of operation will be obvious. The tube to be upset or expanded is positioned within the proper die, the die is closed, and the clamping lever 6 locked, and the drift pin 3 is then positioned properly and driven home.

What we claim as our invention is:

1. A tool for the purpose specified, comprising a complemental pair of gripping members formed with die halves for receiving a tube, a drift pin, and means supporting said drift pin for movement in a plane normal to the axis of the die halves into and from axial alinement with the said die and pipe held therein, and said means being itself movable axially of the die halves, and offset therefrom.

2. A tool for the purpose specified, comprising a complemental pair of gripping members formed with a plurality of pairs of die halves for receiving tubes, a drift pin, and means movable axially of the die halves but offset therefrom, said means supporting said drift pin for transverse movement into and from axial alinement with any selected pair of die halves.

3. A tool for the purpose specified, comprising a complemental pair of gripping dies, a drift pin, and means supporting said drift pin from said dies for movement into and from axial alinement with said die and pipe held therein, and permitting rectilinear axial movement of said drift pin when in alinement with the die.

4. A tool for the purpose specified, comprising a pair of pivoted jaws formed with complemental die halves, a drift pin, and means supported at the pivot of said jaws for supporting said drift pin for movement into and from axial alinement with the die, and for axial movement when so alined.

5. A tool as in claim 4, the jaws having a plurality of pairs of die halves spaced along the jaws, and the drift pin support permitting lateral movement of the drift pin into registry with any selected die.

6. A tool as in claim 4, the drift pin support including a member tending to draw the drift pin into the die, but yieldable to permit the drift pin to move axially out of the die.

7. A tool as in claim 4, the jaws having a plurality of pairs of die halves spaced along the jaws, and the drift pin support permitting lateral movement of the drift pin into registry with any selected die, the drift pin support including a member tending to draw the drift pin into any die with which it is in registry, but yieldable to permit it to move axially out of such die.

8. A tool as in claim 4, the drift pin support including an arm pivotally supported for movement upon an axis coaxial with the jaw's pivot, the jaws having a plurality of die halves spaced therealong, and the drift pin being movable along said arm into position to register with any selected die.

9. A tool for the purpose specified, comprising a pair of jaws pivotally connected between their ends, and formed with complemental die halves, a drift pin, a post supported coaxially in the pivot of said jaws and axially movable, and an arm supported from said post and in turn supporting said drift pin.

10. A tool as in claim 9, the drift pin support including yieldable means urging the drift pin into the die when in registry therewith, and permitting axial movement of the post and drift pin to permit movement of the drift pin into and from registry with the die.

11. A tool as in claim 9, the jaws having a plurality of die halves, the drift pin support including yieldable means urging the drift pin into each die when in registry therewith, and permitting axial movement of the post and drift pin relative to the dies, the drift pin being movable along the arm into position thereon to register with any selected die.

12. A tool for the purpose specified, comprising a pair of jaws having complemental die halves formed therein, a pivot sleeve connecting the jaws between their ends, a post received in said sleeve, an arm projecting laterally from the post, a drift pin carried by said arm and adapted to register with said die, and a spring interposed between said sleeve and said post to urge the drift pin into the die and tube held therein, and yieldable to permit withdrawal or entrance of the drift pin.

Signed at Seattle, Washington, this 22nd day of June, 1929.

JAMES CANNY.
HOWARD BLONDEAU.